US005603572A

United States Patent [19]

Shmois et al.

[11] Patent Number: 5,603,572

[45] Date of Patent: Feb. 18, 1997

[54] TEMPERATURE SENSOR FOR A MICROWAVE ENVIRONMENT

[75] Inventors: Jacob M. Shmois, Rochester; Fugui He, Penfield; Francisco Chiarilli, Spencerport; David E. Foeller, Batavia; Kenneth D. Corby, Rochester, all of N.Y.

[73] Assignee: Eastman Kodak Company, Rochester, N.Y.

[21] Appl. No.: 357,846

[22] Filed: Dec. 15, 1994

[51] Int. Cl.[6] .................... G01K 7/16; G01K 13/00

[52] U.S. Cl. .................... 374/185; 374/141; 422/26; 422/82.12; 338/22 R

[58] Field of Search .................... 374/120, 185, 374/141; 338/28, 22 R; 422/26, 98, 82.12

[56] References Cited

U.S. PATENT DOCUMENTS

| | | | |
|---|---|---|---|
| 2,967,428 | 1/1961 | Burgert | 374/185 |
| 3,153,769 | 10/1964 | Moses | 374/185 |
| 3,286,214 | 11/1966 | Kolb et al. | 374/185 |
| 3,721,001 | 3/1973 | Crosby et al. | 374/185 |
| 3,754,201 | 8/1973 | Adams | 338/28 |
| 4,265,117 | 5/1981 | Thoma et al. | 374/185 |
| 4,436,438 | 3/1984 | Voznick | 374/185 |
| 4,702,619 | 10/1987 | Camp et al. | 374/185 |
| 4,770,545 | 9/1988 | Takada et al. | 374/185 |
| 4,971,452 | 11/1990 | Finney | 374/208 |
| 5,176,451 | 1/1993 | Sasada et al. | 374/179 |

FOREIGN PATENT DOCUMENTS

| | | | |
|---|---|---|---|
| 0305271 | 3/1989 | European Pat. Off. | 374/120 |
| 004223440 | 1/1994 | Germany | 374/120 |
| 0008575 | 1/1979 | Japan | 374/185 |
| 0014727 | 1/1982 | Japan | 374/185 |
| 0150833 | 9/1983 | Japan | 374/185 |

*Primary Examiner*—Diego F. F. Gutierrez
*Attorney, Agent, or Firm*—William F. Noval

[57] ABSTRACT

A temperature sensor for use in a microwave oven includes a metallic housing including a sleeve with a central passage, a metallic top plate coupled to the metallic housing to close off a first end of the central passage, and a temperature dependent resistor sensor element thermally coupled with the metallic plate. The sensor element is coupled to a signal transmission cable that passes through a bottom cap which closes off the other end of the central passage. The transmission cable is preferably connected to the bottom cap by soldering around the entire interface of the cable with the bottom cap. The cable includes at least 90% shielding and plastic insulation sufficient to resist temperatures up to 200 degrees centigrade. The sleeve is preferably filled with an epoxy cement that surrounds the sensor element.

8 Claims, 3 Drawing Sheets

TEMPERATURE SENSOR FOR A MICROWAVE ENVIRONMENT

FIELD OF THE INVENTION

The invention relates generally to a temperature sensor for use in a microwave oven. More specifically, the invention relates to a temperature sensor that can be readily coupled to a microwave shield used, for example, in a microwave-sterilization device which is inserted in a microwave oven during a sterilization process.

BACKGROUND OF THE INVENTION

Devices are known for performing microwave-sterilization of medical and dental instruments. A microwave-sterilization device for dental instruments, for example, is discussed in PCT WO 93/18798 in which a sealed pouch—with instruments located inside—is positioned with at least an instrument retaining portion of the pouch between two microwave shields. The shields form a microwave shield chamber that is disposed around the metal instruments. As is well-known, the shield chamber prevents the transmission of microwave radiation to the metal instruments, as the unrestricted transmission of the microwave radiation would cause unwanted heating or arcing of the instruments and result in damage.

During the sterilization process, the microwave-sterilization device is placed in a common residential or commercial microwave oven and the microwave energy generated by the oven is used to vaporize a sterilization fluid such as water. The steam produced from the sterilization fluid is introduced into the instrument portion of the pouch to sterilize the instruments contained therein. The temperature of the pouch reaches a temperature of over 133 degrees centigrade during the sterilization process and must be maintained over a predetermined period of time to guarantee the instruments contained therein are properly sterilized.

In order to guarantee that the sterilization process is successful, it is important to monitor the temperature of the pouch to make certain that the proper sterilization temperature has been reached during the sterilization process. Conventional temperature sensors developed for microwave ovens, however, have been found to degrade over time at the temperatures associated with the sterilization process. In addition, the conventional sensors have an insufficient degree of accuracy, a low response time, to much signal noise, and do not interface well with the pouches utilized in the type of microwave-sterilization device discussed above.

SUMMARY OF THE INVENTION

It is an object of the invention to provide a microwave temperature sensor that overcomes the above-mentioned deficiencies of conventional microwave temperature sensors. Specifically, a temperature sensor in accordance with the invention includes a metallic housing comprising a sleeve having first and second open ends, a metallic plate coupled to the metallic housing to close off the first open end of the sleeve, and a sensor element secured in thermal contact with the metallic plate. The temperature sensor is coupled to a signal transmission cable that passes through a bottom cap coupled to the metallic housing to close off the second open end of the sleeve. The cable includes at least 90% shielding and insulation sufficient to resist temperatures up to 200 degrees centigrade. The signal transmission cable is soldered at the bottom cap to prevent any leakage of microwave radiation. The sleeve is preferably filled with an epoxy cement which surrounds the temperature dependent resistor sensor element and its thin wires.

Thus, an advantageous feature of the invention is a sensor particularly suited for use in monitoring the temperature in various types of microwave-sterilization devices. The invention may also be employed in any application requiring a temperature measurement in a microwave environment.

BRIEF DESCRIPTION OF THE DRAWINGS

The invention will be described in greater detail with reference to the attached drawings, wherein.

DESCRIPTION OF THE PREFERRED EMBODIMENTS

The invention will be described with reference to a particular microwave-sterilization device for purposes of illustrating the invention. It will be understood, however, that the invention is not limited to use with the specifically described microwave-sterilization device or with sterilization instruments in general, but can be utilized in any application requiring temperature measurement in a microwave environment.

Figure 1:
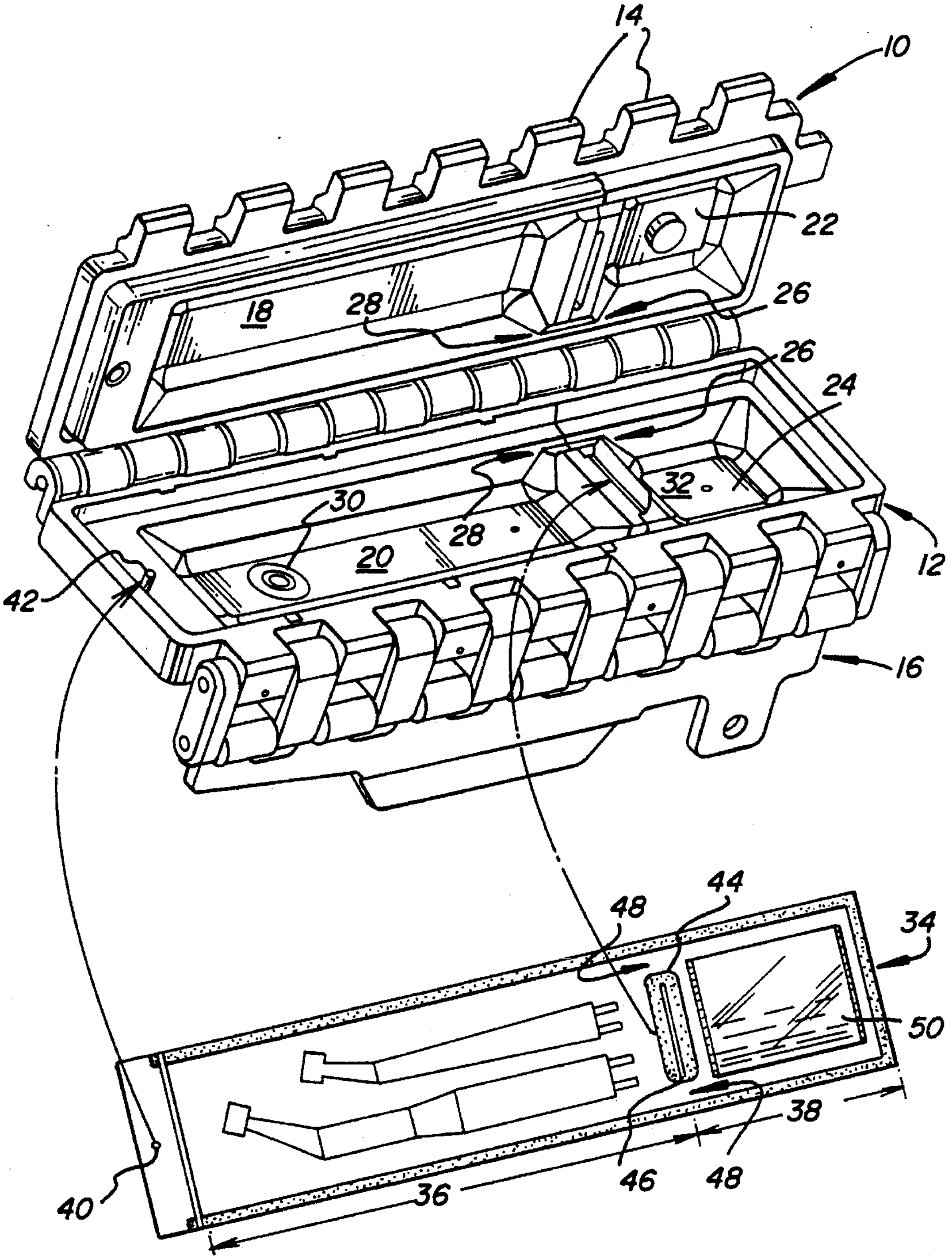
FIG. 1 is a perspective view of a microwave-sterilization device incorporating a temperature sensor in accordance with the invention.

An example of a microwave-sterilization device of a type described in co-pending U.S. patent application Ser. No. 08/222,211 entitled "Medical Instrument Shield and Pouch for Microwave Sterilization", filed on Apr. 4, 1994, is shown in FIG. 1. The microwave-sterilization device includes a container structure having an upper container portion 10 hinged to a lower container portion 12. One edge of the upper container portion 10 includes locking members 14 that cooperate with a hinged locking member 16 located on the lower container portion 12. First and second microwave shields 18, 20 are respectively located in concavities formed in the upper and lower container portions 10, 12, so that a shielded chamber is provided for instruments to be sterilized when the upper and lower container portions 10, 12 are closed. The upper and lower container portions 10, 12 also include upper and lower concavities 22, 24, which together form a steam-generating chamber when the upper and lower container portions 10, 12 are closed. The upper and lower concavities 22, 24 include at least one liquid access aperture 26 that cooperates or aligns with liquid access apertures 28 formed in the microwave shields 18, 20. A temperature sensor 30, in accordance with the invention, is fitted in one of the microwave shields (second shield 20 in the illustrated embodiment) and a pressure relief device that operates with a pressure relief hole or passage 32 is provided in the steam generating chamber.

Figure 6:
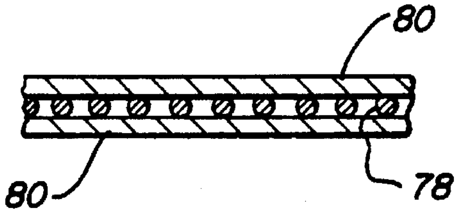
FIG. 6 is a cross-sectional view of an embodiment of a temperature sensor element.

A pouch 34, including an instrument retaining portion 36 and a fluid retaining portion 38, is loaded into the microwave-sterilization device. As illustrated in FIG. 6, the pouch 34 preferably includes a locating pin hole 40 at one end thereof that aligns with a locating pin 42 provided in the microwave-sterilization device, and a central seal 44 that defines the boundary between the fluid retaining portion 38 and the instrument retaining portion 36. A slot 46 is formed in the central seal 44 to permit the pouch 34 to be fitted over an upwardly extending side edge portion of the second microwave shield 20. Steam/condensate slots 48 are located on each side of the central seal 44, and are aligned with the liquid access apertures 26, 28 when the pouch 34 is loaded in the microwave-sterilization device. The steam/condensate slots 48 permit steam to be transferred from the fluid retaining portion 38 to the instrument retaining portion 36 during a sterilization operation. A water pillow 50 containing sterilizing water is located in the fluid retaining portion 38 of the pouch 34.

After loading of the pouch 34, the microwave-sterilization device is placed into a microwave oven (for example a standard commercial use 1000 watt oven), and the water within the water pillow 50 is vaporized by the application of microwave energy to form steam. The heat and pressure from the steam generation causes the water pillow 50 to rupture, thereby allowing the steam to pass into the instrument retaining portion 36, via the steam/condensate slots 48, in order to sterilize instruments contained therein. The instruments must be heated to a temperature of about 133 degrees centigrade for two minutes to achieve proper sterilization. The temperature of the pouch 34 must therefore be accurately monitored by the temperature sensor 30.

Figure 2:
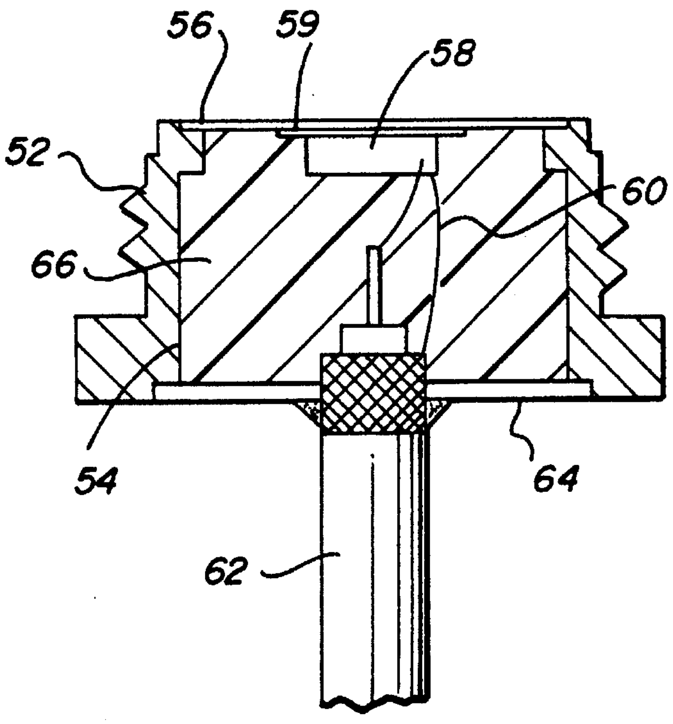
FIG. 2 is a cross-sectional view of a temperature sensor in accordance with the invention.

A cross-section of a temperature sensor 30 for use in a microwave oven in accordance with the invention is shown in FIG. 2. The temperature sensor 30 includes a metallic housing 52, preferably a threaded annular sleeve having a central passage 54 that is open at both ends, and a metallic top plate 56 soldered or crimped to a first end of the metallic housing 52 to close off one end of the central passage 54. The metallic top plate 56 is preferably made of beryllium copper (although other metallic materials having sufficient heat transfer characteristics can be utilized) and has a thickness of about 0.015 inches or less. A temperature dependent resistor (RTD) sensor element 58 (for example a 1000 ohm F3141 RTD Sensor available from Omega, Inc. of Stanford, Conn.) is bonded to the metallic top plate 56 with an adhesive 59. The sensor element 58 includes lead wires 60 that are connected to an insulated signal transmission cable 62 that passes through and is soldered to a metallic bottom cap 64. The cable 62 preferably has at least 90% shielding (for example a wire braid layer having 90% coverage) to prevent noise from being introduced into the signal generated by the sensor element 58, and an insulation sufficient to resist temperatures up to 200 degrees C. A Belden RG-59/U Type 89259 cable with a TEFLON jacket or an Alpha 2834/2 cable, for example, can be utilized for the signal transmission cable 62. The bottom cap 64 is soldered or crimped to a second end of the metallic housing 52 to close off the second end of the central passage 54. Prior to soldering of the bottom cap 64, the central passage 54 is preferably filled with a low heat transmission epoxy cement 66 that surrounds the sensor element 58 and lead wires 60, and helps to insulate the back side of the sensor element from interior temperature of the microwave oven. The opposite end of the cable 62 is terminated with a standard miniature phone plug, for example a Switchcraft 780 miniature phone plug, that can be inserted into the temperature sensor receptacle of a standard microwave oven, which in turn iS coupled to oven control circuitry and/or a temperature display. Termination of the phone plug with the cable 62 is preferably performed to provide metal-to-metal contact between the phone plug and the cable shielding along the entire circumference of the cable 62 to prevent signal noise due to microwave leakage.

The thin metallic top plate 56 provides an important heat transfer function. Specifically, the metallic top plate 56 comes into contact with the pouch 34 when the temperature sensor 30 is located in the microwave-sterilization d evice, and permits the heat from the pouch 34 to be easily transferred to the sensor element 58, as a relatively large surface area of the plate 56 is in contact with the pouch 34. At the same time, however, the thickness of the plate 56 prevents residual heat from being transferred from the metallic housing 52 or the microwave shield 20 to the sensor element 58, as the thin cross-section of the plate 56 is a poor thermal conducting path. Accordingly, it is possible for the sensor element 58 to provide a highly accurate reading of the actual temperature of the pouch 34 while being thermally isolated from the metallic housing 52 and shield 20. The sensor element 58 is also completely shielded from microwave radiation.

Figure 3:
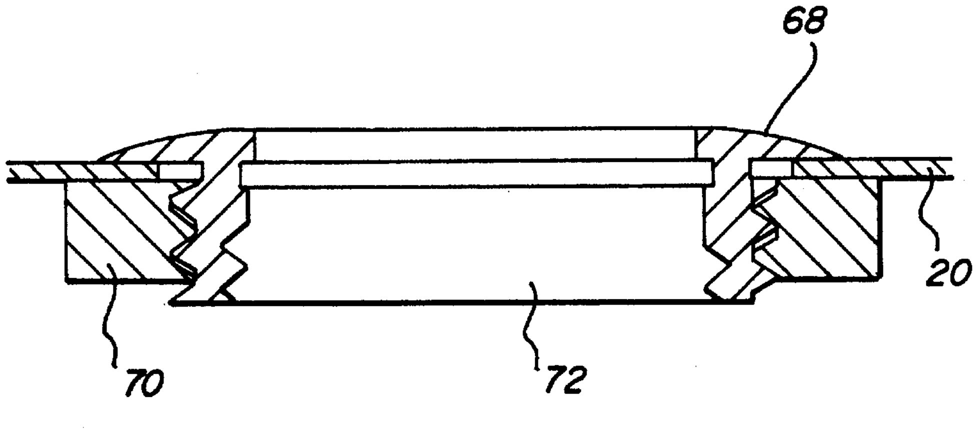
FIG. 3 is a cross-sectional view of a tapered collar coupled to a microwave shield of the microwave-sterilization device illustrated in FIG. 1.
Figure 4:
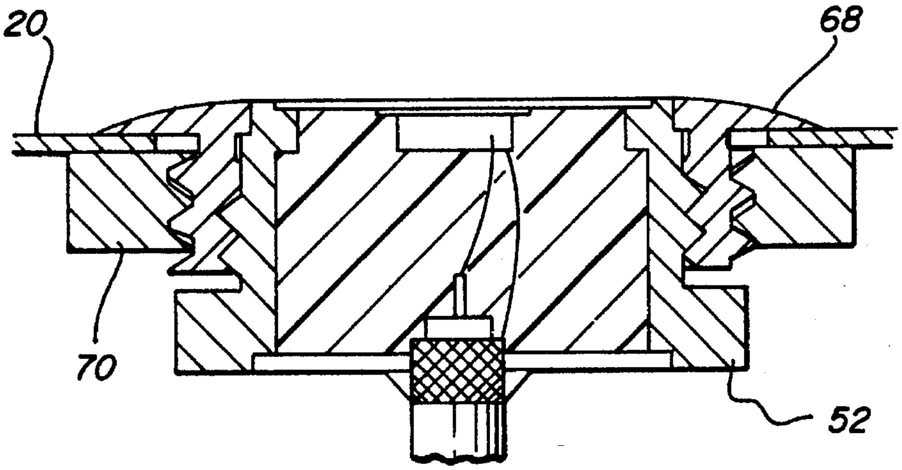
FIG. 4 is a cross-sectional view of the temperature sensor of FIG. 2 located in the tapered collar of FIG. 3.

In order to minimize the possibility of rupturing the pouch 34 by the sharp edges of the housing 52, and to enable the temperature sensor 30 to be easily attached to the microwave shield 20, a tapered collar 68 is attached to the microwave shield 20 with a locking nut 70 as shown in FIG. 3. The collar 68 includes a central opening 72 that is threaded to receive the metallic housing 52 as shown in FIG. 4. Alternatively, the tapered collar 68 can be combined with the metallic housing 52 as shown in FIG. 4, i.e., the metallic housing 52 is provided with a tapered collar portion 74 thereby eliminating the need for a separate part and simplifying the overall design of the temperature sensor 30. In addition, the metallic housing 52 can be provided with flat sections 76, if desired, to make it easier to hold the metallic housing 52 during installation and tightening.

Figure 5:
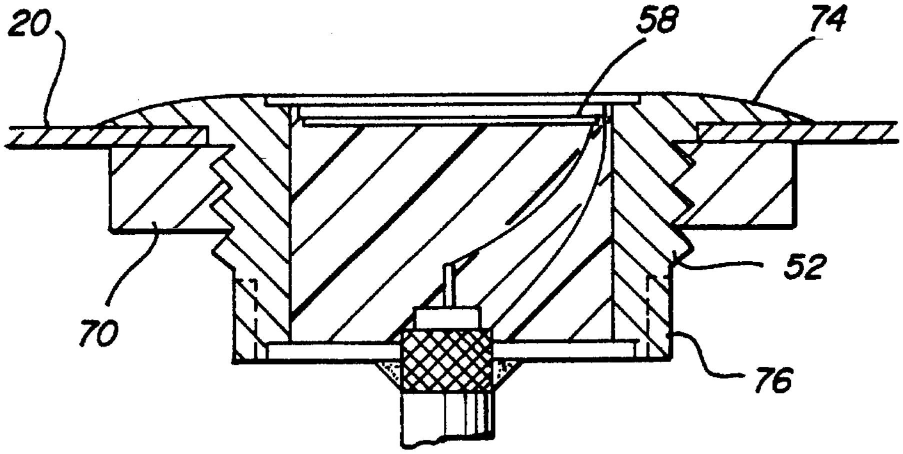
FIG. 5 is a cross-sectional view of a further embodiment of the invention wherein the housing of the temperature sensor is combined with a tapered collar.

The invention has been described with reference to certain preferred embodiments thereof. It will be understood, however, that modifications and variations are possible within the scope of the appended claims. For example, different types of RTD sensor elements, having varying electrical and physical characteristics, can be readily employed for the sensing element 58. In FIG. 5, for example, the sensing element 58 is shown as covering almost the entire bottom surface of the metallic top plate 56. It is desirable to utilize a sensor element having a large surface area to improve response characteristics. Such a sensor element can be manufactured by sandwiching a spirally wound temperature dependent resistor element 78 between two thin isolating substrates 80 as illustrated in FIG. 6. Alternatively, the sensor element 58 can be manufactured by winding a nickel-iron temperature dependent resistor wire around a bobbin. In addition, although the sensor element 58 is adhesively bonded to the metallic top plate 56 in the illustrated embodiment to aid in properly locating the sensor element 58 during manufacture, it is not necessary to physically bond the sensor element 58 to the top plate 56 as long as sufficient thermal coupling is maintained therebetween.

What is claimed is:

1. A temperature sensor for use in a microwave oven comprising:

a metallic housing comprising a sleeve having first and second open ends;

a metallic top plate coupled to the metallic housing to close off the first open end of the sleeve;

a temperature dependent resistor sensor element located within the sleeve and adjacent to the metallic top plate, wherein the temperature dependent resistor sensor element is thermally coupled with the metallic top plate;

a bottom plate coupled to the metallic housing to close off the second open end of the sleeve;

a signal transmission cable coupled to the temperature dependent resistor sensor element that passes through an opening in the bottom plate; and a tapered collar having a central opening for receiving said metallic housing.

2. A temperature sensor as defined in claim 1, wherein the metallic top plate is sufficiently thin as to minimize thermal transfer from the metallic housing to the temperature dependent resistor sensor element.

3. A temperature sensor as defined in claim 2, wherein the metallic top plate has a thickness of 0.015 inches or less.

4. A temperature sensor as defined in claim 1, wherein the metallic top plate comprises beryllium copper.

5. A temperature sensor as defined in claim 1, wherein the signal transmission cable includes at least 90% shielding and insulation sufficient to resist temperatures up to 200 degrees centigrade.

6. A temperature sensor as defined in claim 1, further comprising means for coupling the metallic housing to a microwave-sterilization device.

7. A temperature sensor as defined in claim 1, wherein the temperature dependent resistor sensor element is adhesively bonded to the metallic top plate.

8. A temperature sensor as defined in claim 1, wherein the sleeve is filled with an epoxy cement.

* * * * *